Dec. 20, 1966   M. E. NEUMANN   3,293,518
SYNCHRONOUS MOTOR STARTING CIRCUIT
Filed July 16, 1964
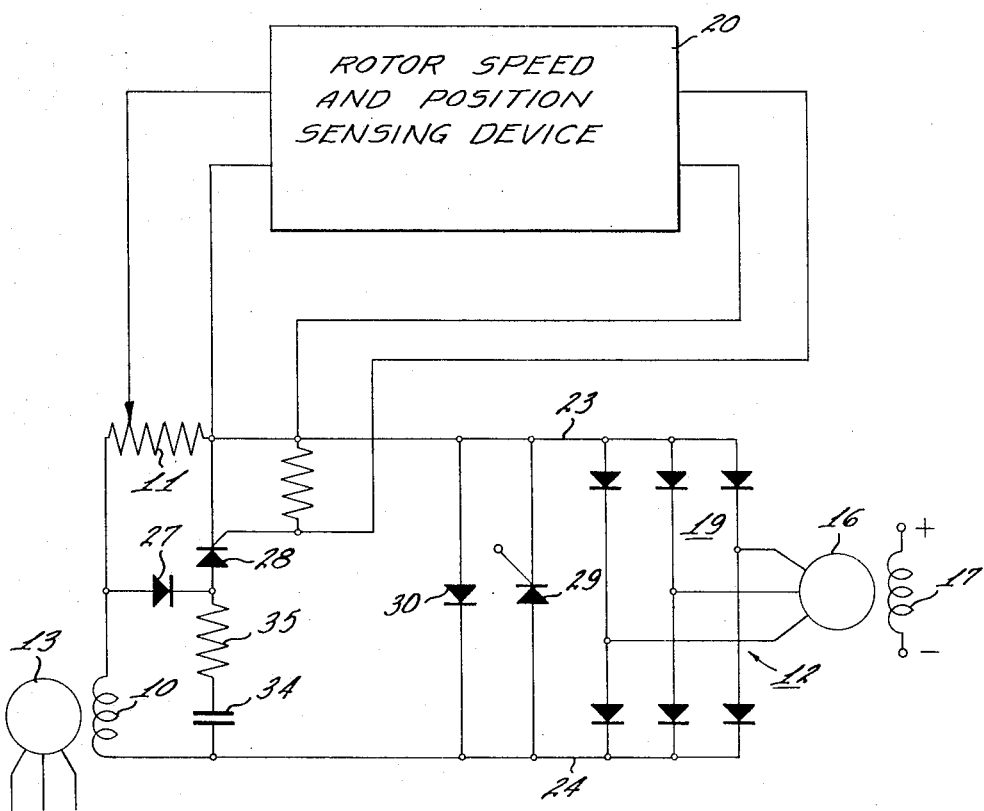
Inventor
Manfred E. Neumann
By Joseph E. Kerwin
Attorney

3,293,518
SYNCHRONOUS MOTOR STARTING CIRCUIT
Manfred E. Neumann, New Berlin, Wis., assignor to Allis-Chalmers Manufacturing Company, Milwaukee, Wis.
Filed July 16, 1964, Ser. No. 383,021
7 Claims. (Cl. 318—176)

This invention relates generally to motor controls, more specifically to a starting circuit for a synchronous motor.

A synchronous motor of the type using this circuit has a stationary armature winding energized with polyphase alternating current and a field winding that is mounted on a rotor and energized from a direct current exciter. These motors usually have squirrel cage windings on the rotor that cooperate with the armature winding for accelerating to the synchronizing speed. When the motor has reached synchronizing speed, the exciter is connected to energize the field winding. An object of this invention is to provide a new and improved circuit for connecting the field winding and the exciter, first for subsynchronous acceleration and then for synchronous operation; such a circuit will be called a starting circuit.

While the motor is below synchronous speed, the armature and field windings act as a transformer and an alternating polarity voltage appears in the field winding. Because the turns ratio between the armature winding and the field winding is high, the open circuit voltage induced in the field winding greatly exceeds the voltage that is later applied to the field winding, the starting circuit is provided with a switch to short circuit the field winding for starting to distribute the induced field voltage through the winding as impedance drops.

Ordinarily the field winding is short circuited through an appropriate resistor in phase. Since several electrical and mechanical pulses would occur in the motor if excitation were applied during starting, switches in the starting circuit are arranged also to electrically isolate the exciter from the field winding for starting and to connect the field winding to the exciter for synchronous operation.

Silicon controlled rectifiers are sometimes used for switches in the starting circuit. In these circuits there is a problem of providing a suitable turn off mechanism to interrupt the circuit of the field discharge resistor. The prior art has suggested using turn off action of the controlled rectifiers in response to the polarity changes in the induced field current. However, there would be several advantages in a motor circuit which could be switched from its subsynchronous accelerating state to its synchronous operating state at other points in the cycle of the induced field current. One object of this invention is to provide a new and improved starting circuit that can be switched to its synchronous operating state at a point in the induced field current wave form in which the short circuiting controlled rectifier is conducting in a polarity that would short circuit the direct current exciter (i.e., the negative half cycle of induced field current).

Another object of this invention is to provide a new and improved starting circuit that can be mounted on the rotating shaft of the motor. Another object is to provide a new and improved starting circuit for a synchronous motor in which an oncoming controlled rectifier functions to connect the circuit for synchronous operation and also to turn off an off-going controlled rectifier.

The circuit of this invention has a first controlled rectifier that connects the field winding to be short circuited through a discharge resistor and a second controlled rectifier that is connected to short circuit the resistor. To switch to the synchronous operating state, the first controlled rectifier is turned off and the second controlled rectifier is turned on. The circuit includes a capacitor that is connected by means of a diode across the field winding to be charged to a high voltage. The capacitor terminals are connected to the terminals of the two controlled rectifiers so that when the second controlled rectifier is turned on, it connects the capacitor to apply a reverse voltage across the anode-cathode terminals of the first controlled rectifier to turn it off.

The drawing and the detailed description of the invention will suggest other problems in providing a suitable starting circuit and related features and objects of this invention.

In the drawing the single figure is a schematic of a synchronous motor, an exciter and the control of this invention.

Introduction

The circuit of this invention connects the field winding 10 of a synchronous motor in circuit with a discharge resistor 11 while the motor is below synchronizing speed and short circuits the resistor and connects an exciter 12 to energize field winding 10 when the rotor that carries the field winding has the appropriate speed and position with respect to the rotating M.M.F. of the motor armature winding 13. Preferably exciter 12 includes an armature winding 16 mounted on the motor shaft and a stationary field winding 17. Rotation of armature winding 16 within the magnetic field of winding 17 produces an alternating voltage at the exciter armature terminals, and a rectifier 19 is connected to provide a polarity invariant voltage across its terminals 23, 24 for exciting motor field winding 10. A device 20 is connected to receive information about the rotor speed and position with respect to the rotating M.M.F. of the motor armature 13 and to produce a signal to switch the circuit of field winding 10 and exciter 12 from its sub-synchronous state to its synchronous state. In the drawing, box 20 represents a suitable rotor speed and position sensing circuit connected conventionally to receive a measure of the current wave form of discharge resistor 11.

The motor starting circuit

The circuit for short circuiting the field discharge resistor 11 comprises the series combination of a diode 27 and a controlled rectifier 28. Diode 27 and controlled rectifier 28 have other functions that will be described later; these components are introduced now to help explain the current and voltage polarities in the circuit; notice that when diode 27 and controlled rectifier 28 are turned on they connect exciter 12 to energize field winding 10 with exciter terminal 23 negative and terminal 24 positive and with a clockwise current loop in the circuit of field winding 10.

During subsynchronous operation, an alternating polarity voltage is induced in motor field winding 10. The half cycle in which the induced field current is the same polarity as the normal excitation current will be called the positive half cycle and the opposite polarity half cycle will be called negative. During acceleration, when field winding 10 acts as a voltage source and resistor 11 acts as a load, the voltage polarities have the opposite relation to current polarities as during synchronous operation when exciter 12 is a source and winding 10 is a load; terminal 23 is positive with respect to terminal 24 on positive half cycles and negative on negative half cycles.

A switch comprising a controlled rectifier 29 and a diode 30 is provided to connect discharge resistor 11 to short circuit field winding 10 and also to short circuit exciter terminals 23, 24, to prevent applying excitation to the field during acceleration. Exciter 12 may be conductively isolated from field winding 10 during starting by means of a semiconductor switch device or it may remain connected, as shown, and be provided with sufficient impedance to limit its short circuit current to a safe value.

Diode 30 is connected across exciter terminals 23, 24 in a polarity to turn off during synchronous operation (when terminal 23 is negative and 24 is positive) and to conduct on positive half cycles of induced field current. Thus, diode 30 switches automatically from subsynchronous to synchronous operation as field winding 10 becomes a load instead of a source.

Controlled rectifier 29 is connected to conduct as a load on both field winding 10 and exciter 12 during negative half cycles of induced field current. Controlled rectifier 29 is selected to have a volt-ampere characteristic to begin conducting between its anode and cathode terminals when the negative half cycle of induced voltage rises above a predetermined low value, this can be accomplished whether or not the gate terminal 29 is energized. Controlled rectifier 29 turns off during the positive half cycle of induced field current in response to the reverse voltage across its anode and cathode terminals.

For synchronization, field winding 10 should receive excitation during the positive half cycle; however, to allow for the delay in applying excitation associated with the circuit time constants, switch 29, 30 is opened during the second half of the negative half cycle. This presents a problem of turning off controlled rectifier 29; the circuit for turning off controlled rectifier 29 will be described next.

Diode 27 and controlled rectifier 28 form part of a circuit that turns off controlled rectifier 29 when controlled rectifier 28 is turned on at the selected point in the negative half cycle by rotor speed and position sensing circuit 20. Controlled rectifier 28 has its gate terminal connected through a resistor to its cathode terminal and the rotor speed and position sensing circuit is connected to produce a current pulse in the gate-cathode circuit. The turn off circuit also has a capacitor 34 and a resistor 35 that cooperates with diode 27 to connect the capacitor to be charged by field winding 10 during positive half cycles of induced field current. When controlled rectifier 28 is turned on, it connects capacitor 34 and resistor 35 across the anode-cathode terminals of controlled rectifier 29 in the appropriate polarity to turn off controlled rectifier 29. Capacitor 34 has the appropriate capacitance in relation to the charging voltage developed across winding 10 (which may be about 1000 volts) to provide a current pulse of sufficient height and width to turn off controlled rectifier 29. At the same time the parallel connected circuits of rectifier 19, diode 30, are connected to winding 10 in series with diode 27 and controlled rectifier 28. Resistor 35 has the appropriate resistance to limit the charging current in the circuit of field winding 10, diode 27, and capacitor 34 and to widen the current pulse sufficiently for turning off controlled rectifier 29.

*Operation.*—The starting circuit operates whenever the motor is started or falls out of synchronism and is to be resynchronized. While the motor is below synchronous speed, the open circuit value of induced field voltage is high enough to turn on switch 29, 30 and thereby isolate field winding 10 from exciter 12. During the first negative half cycle, controlled rectifier 28 turns off in response to the reverse voltage across its anode and cathode terminals. During subsequent positive half cycles, diode 27 turns on and connects capacitor 34 to be charged (in parallel with the series combination of resistor 11 and diode 30) to the peak terminal voltage of field winding 10. Because the induced field voltage decreases with motor speed, diode 27 turns off after a few cycles.

As the motor speed increases, the induced field voltage decreases and the exciter voltage increases so that near synchronizing speed controlled rectifier 29 remains on continuously and diode 30 remains off continuously. (That is, in the circuit of controlled rectifier 29 the positive half cycle of induced field current is superimposed on the higher magnitude exciter short circuit current.)

When the motor has reached its synchronizing speed and the rotor has reached an appropriate position, rotor speed and position sensing circuit 20 produces a signal at the gate terminal of controlled rectifier 28. When controlled rectifier 28 turns on, it cooperates with diode 27 to connect exciter terminals 23, 24 to field winding 10 and it cooperates with capacitor 34 to turn off controlled rectifier 29 to remove the short circuit across terminals 23, 24.

In this circuit diode 30 can be rated to carry the complete positive half cycle of the field current. Hence diodes in rectifier 19 do not have to carry the induced field current but only the exciter current. Therefore, the diodes in the rectifier 19 can be of smaller rating than would be required in the absence of diode 30.

From the block diagram of rotor speed and position sensing device 20 and from the detailed description of the preferred embodiment of the starting circuit of this invention, those skilled in the art will recognize a variety of specific suitable rotor speed and position sensing circuits and within the scope of the claims variations in details and in component types in the starting circuit.

Having now particularly described and ascertained the nature of my said invention and the manner in which it is to be performed, I declare that what I claim is:

1. A circuit for connecting a synchronous motor field winding to its exciter for synchronous operation and to be short circuited and isolated from its exciter for subsynchronous acceleration, comprising:
    a first semiconductor switch device having a pair of load terminals connected to short circuit the field winding in at least one direction of induced field current when said first device is turned on, said device being of the type to stop conduction in said one direction when an opposite polarity voltage is applied across its load terminals, said load terminals being connectable to the exciter terminals for synchronous operation,
    a capacitor having one of its terminals connected to one terminal of said first semiconductor device,
    a second semiconductor device connecting said capacitor across the terminals of the field winding to be charged on half cycles of induced field current opposite to said one direction of induced field current,
    a third semiconductor device responsive to a control signal to turn on and conduct between a pair of load terminals, one of its load terminals being connected to the other terminal of said capacitor, the other of its load terminals being connected to the other terminal of said first semiconductor device to apply the voltage of the capacitor to said first device in a polarity to turn off said first device when said third device is turned on.

2. A circuit according to claim 1 including field discharge resistor means connected in parallel with said second and third semiconductor devices.

3. A circuit according to claim 2 in which said other terminal of said capacitor is connected to the common connection point of said one terminal of said third semiconductor device and one terminal of said second semiconductor device, the other terminal of said second semiconductor device being connected to a terminal of the field winding.

4. A circuit according to claim 3 in which said resistor means has two terminals, one connected to the other terminal of said second semiconductor device and the other connected to said other terminal of said third semiconductor device.

5. A circuit for connecting a synchronous motor field winding to its exciter for synchronous operation and to be short circuited and isolated from its exciter for subsynchronous acceleration, comprising:

a first semiconductor unidirectional conducting device of the type that conducts between a pair of load terminals only when gated and that turns off in response to a voltage of the opposite polarity across the load terminals, said terminals being connected to the exciter to short circuit the exciter once said device is conducting, a field discharge resistor connecting said first device to conduct negative half cycles of induced field current, means for turning off said first device during a negative half cycle of induced field current to connect the exciter and the field winding for synchronous operation, said first device of the type that conducts in response to a predetermined voltage across said load terminals, said voltage being higher than the terminal voltage of the exciter and less than the open circuit induced field voltage, said means for turning off comprising a capacitor, a second semiconductor unidirectional conducting device connecting said capacitor to be charged across the terminals of the field winding, and a third semiconductor unidirectional conducting device of the type that conducts when gated, said third device being connected to apply the voltage of said capacitor across the terminals of said first semiconductor device in a polarity to turn off said first device when said third device is gated.

6. A circuit according to claim 5 in which said third device is connected to short circuit said field discharge resistor when said third device is gated.

7. A circuit according to claim 6 in which said second device and said third device are connected to short circuit said resistor in series when said third device is gated.

References Cited by the Examiner

UNITED STATES PATENTS

| | | | |
|---|---|---|---|
| 3,098,959 | 7/1963 | Rosenberry | 318—181 |
| 3,100,279 | 8/1963 | Rohner | 318—181 X |

ORIS L. RADER, *Primary Examiner.*

G. Z. RUBINSON, *Assistant Examiner.*